(12) United States Patent
Hu et al.

(10) Patent No.: US 12,468,131 B2
(45) Date of Patent: Nov. 11, 2025

(54) FLY-EYE LENS GROUP, LIGHT SOURCE DEVICE, AND PROJECTION APPARATUS

(71) Applicant: APPOTRONICS CORPORATION LIMITED, Shenzhen (CN)

(72) Inventors: Fei Hu, Shenzhen (CN); Chen Chen, Shenzhen (CN); Meini Mo, Shenzhen (CN); Yi Li, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 685 days.

(21) Appl. No.: 17/867,338

(22) Filed: Jul. 18, 2022

(65) Prior Publication Data

US 2022/0357561 A1 Nov. 10, 2022

Related U.S. Application Data

(63) Continuation of application No. PCT/CN2020/137116, filed on Dec. 17, 2020.

(30) Foreign Application Priority Data

Jan. 19, 2020 (CN) .......................... 202010060197.3

(51) Int. Cl.
 *G03B 21/14* (2006.01)
 *G02B 13/06* (2006.01)

(52) U.S. Cl.
 CPC ............. *G02B 13/06* (2013.01); *G03B 21/14* (2013.01)

(58) Field of Classification Search
 None
 See application file for complete search history.

(56) References Cited

FOREIGN PATENT DOCUMENTS

| | | | |
|---|---|---|---|
| CN | 102722072 A | 10/2012 | |
| CN | 106353958 A | 1/2017 | |
| CN | 205992114 U | 3/2017 | |
| CN | 107861178 A | 3/2018 | |
| CN | 109387353 A | 2/2019 | |
| JP | 2002277828 A | 9/2002 | |
| JP | 2007206359 A | 8/2007 | |
| WO | WO-2016148210 A1 * | 9/2016 | ............ H04W 16/26 |
| WO | WO-2020012751 A1 | 1/2020 | |

OTHER PUBLICATIONS

International Search Report and Written Opinion, International Application No. PCT/CN2020/137116, dated Mar. 17, 2021.
Office Action, Chinese patent application No. 202010060197.3, issued Apr. 18, 2025.

\* cited by examiner

*Primary Examiner* — Toan Ton
*Assistant Examiner* — Danell L Owens
(74) *Attorney, Agent, or Firm* — MARSHALL, GERSTEIN & BORUN LLP; Michael P. Furmanek (57) ABSTRACT

A fly-eye lens group, a light source device, and a projection apparatus. The fly-eye lens group includes: a first fly-eye lens, a second fly-eye lens, and a third fly-eye lens. The first fly-eye lens is parallel to the second fly-eye lens, the first fly-eye lens is perpendicular to the third fly-eye lens, a double fly-eye structure is formed by the first fly-eye lens and the second fly-eye lens, and the third fly-eye lens and the first fly-eye lens also form a double fly-eye structure. The fly-eye lens group is used for homogenizing incident first excitation light, excited light, and second excitation light.

17 Claims, 4 Drawing Sheets

FLY-EYE LENS GROUP, LIGHT SOURCE DEVICE, AND PROJECTION APPARATUS

CROSS-REFERENCE TO RELATED APPLICATIONS

The present application is a Continuation of International Application No. PCT/CN2020/137116, filed on Dec. 17, 2020, which claims priority to Chinese Application No. 202010060197.3, filed on Jan. 19, 2020, the contents of all of which are incorporated herein by reference in their entireties.

TECHNICAL FIELD

The present disclosure relates to the technical field of optics, and in particular, to a fly-eye lens group, a light source device, and a projection apparatus.

BACKGROUND

A laser-induced fluorescence technology uses a gallium-nitride-based blue laser to excite fluorescence to generate green light and red light, and is a mainstream technical solution in the field of laser display at present. A core concept of the laser-induced fluorescence technology is as follows. On the one hand, by using a high-efficiency and cost-effective gallium-nitride-based blue laser, limitations of poor thermal stability of red laser material s and low efficiency and short service life of a green laser have been overcome, and a red-green spectrum is realized by using high-efficiency fluorescent materials. On the other hand, since fluorescence is incoherent light, it has no influence in terms of speckles. Fluorescence is used to generate green light and red light that are sensitive to human eyes, and a visual speckle problem caused by coherence of laser light sources can be cleverly avoided. Therefore, the laser-induced fluorescence solution realizes a projection light source with high brightness, high efficiency and high cost performance by combining high brightness of laser with high performance of fluorescence.

An important part of the laser-induced fluorescence technology lies in a fluorescence excitation solution and a fluorescence-laser combination solution. It is of great significance to develop a more efficient and more compact excitation solution and fluorescence-laser combination solution for the development of the laser-induced fluorescence technology.

SUMMARY

The present disclosure provides a light source device, including a light source, a wavelength conversion device, a fly-eye lens group and a light combination device. The light source is configured to emit first excitation light. The wavelength conversion device includes a wavelength conversion section and a non-wavelength conversion section, the wavelength conversion section absorbs the first excitation light and outputs excited light, and the non-wavelength conversion section acts on the first excitation light to output second excitation light. The fly-eye lens group includes a first fly-eye lens, a second fly-eye lens, and a third fly-eye lens, the first fly-eye lens is parallel to the second fly-eye lens, the third fly-eye lens is perpendicular to the first fly-eye lens, the first fly-eye lens and the third fly-eye lens form a double fly-eye structure configured to homogenize the first excitation light emitted from the light source and output the homogenized first excitation light to the wavelength conversion device, and the first fly-eye lens and the second fly-eye lens form another double fly-eye structure configured to homogenize the excited light and the second excitation light outputted from the wavelength conversion device. The light combination device is configured to guide the first excitation light from the third fly-eye lens to the first fly-eye lens, so as to output the first excitation light to the wavelength conversion device, and further configured to guide the excited light and the second excitation light outputted from the wavelength conversion device and passing through the first fly-eye lens to the second fly-eye lens for output.

The present disclosure further provides a fly-eye lens group, including a first fly-eye lens, a second fly-eye lens, and a third fly-eye lens. The first fly-eye lens is parallel to the second fly-eye lens, and the first fly-eye lens is perpendicular to the third fly-eye lens; the first fly-eye lens and the second fly-eye lens form a double fly-eye structure; and the third fly-eye lens and the first fly-eye lens form another double fly-eye structure.

The present disclosure further provides a projection apparatus, including a light modulation device and the light source device described above.

BRIEF DESCRIPTION OF DRAWINGS

In order to more clearly illustrate the technical solutions in embodiments of the present disclosure, the accompanying drawings used in the description of the embodiments will be briefly introduced below. It is apparent that the accompanying drawings in the following description are only some embodiments of the present disclosure, and other drawings can be obtained by those of ordinary skill in the art from the provided drawings without creative efforts.

DESCRIPTION OF EMBODIMENTS

In order to enable those skilled in the art to better understand the solutions of the present disclosure, the technical solutions in the embodiments of the present disclosure will be described in details below with reference to the accompanying drawings in the embodiments of the present disclosure. Apparently, the described embodiments are merely some of rather than all of the embodiments of the present disclosure. All other embodiments acquired by those of ordinary skill in the art without creative efforts based on the embodiments of the present disclosure shall fall within a protection scope of the present disclosure.

The terms such as "first" and "second" in the specification and claims of the present disclosure and the accompanying drawings are intended to distinguish different objects, rather than to describe a specific order. In addition, the terms "include/comprise" and "have" and any variants thereof are intended to cover a non-exclusive inclusion. For example, processes, methods, systems, products or devices including a series of steps or elements are not limited to listed steps or elements, but further optionally include steps or elements that are not listed, or further optionally include other steps or elements inherent to the processes, methods, systems, products or devices.

The technical solutions in the embodiments of the present disclosure will be described below with reference to the accompanying drawings.

It is to be noted that, for ease of description, in the embodiments of the present disclosure, identical reference numerals denote identical elements. Moreover, for brevity, a detailed description of the same element is omitted in different embodiments.

Etendue is an important concept in non-imaging optics, and is used for describing geometric characteristics of a beam with a certain aperture angle and a certain cross-sectional area and is defined as an integral of an area through which the beam passes and a solid angle occupied by the beam.

$$\text{Etendue} = n^2 \iint \cos\theta dA d\Omega,$$

where θ denotes an area element, dA denotes an element between a normal line and the solid angle, and dΩ denotes an angle between central axes. In an ideal optical system where energy loss caused by scattering and absorption is not considered, the etendue remains conservative after the beam passes through the optical system. It measures a change between a beam source area and solid angle diffusion as the beam passes through the optical system. The larger the beam angle or the larger the beam source area, the larger the etendue. Gradual enlargement of the beam in the optical system is called etendue dilution.

The etendue dilution means a larger spot area or a larger divergence angle. The larger spot area requires optical elements and the optical system to be larger, and the larger divergence angle requires the optical elements (especially lenses) and optical system F # (F number) to be smaller, which may increase machining difficulty and costs of the optical system. Therefore, it is always desirable to keep the etendue to be conservative as far as possible in optical design.

The present disclosure provides a fly-eye lens group, a light source device, and a projection apparatus, which can realize more efficient and more compact excitation and fluorescence-laser combination solutions and can reduce the etendue dilution of fluorescence.

Figure 1:
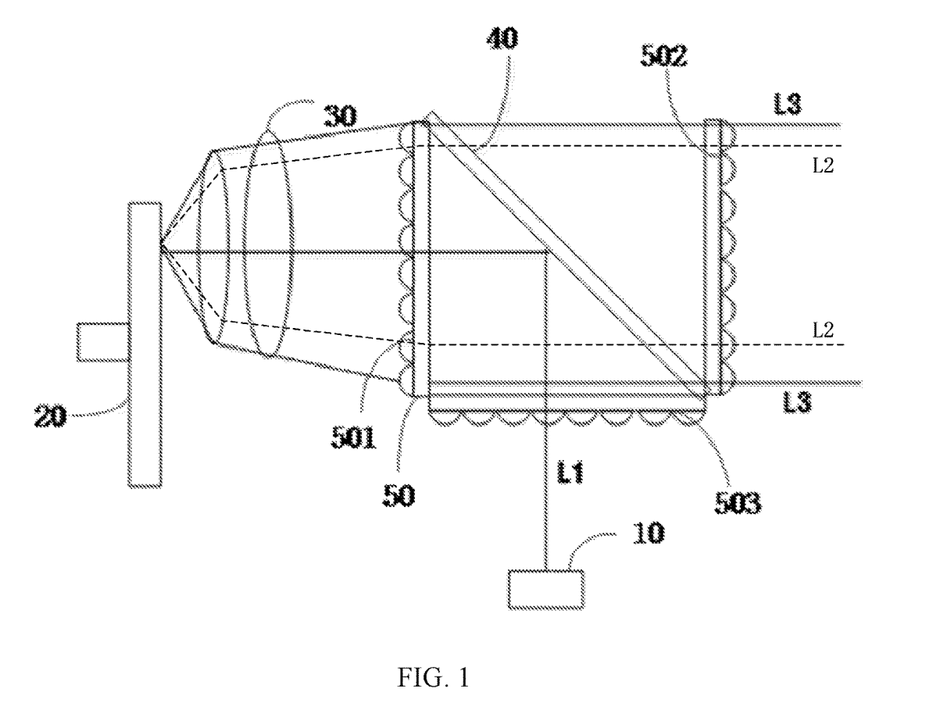
FIG. 1 is a schematic structural diagram of a light source device according to an embodiment of the present disclosure.
Figure 2:
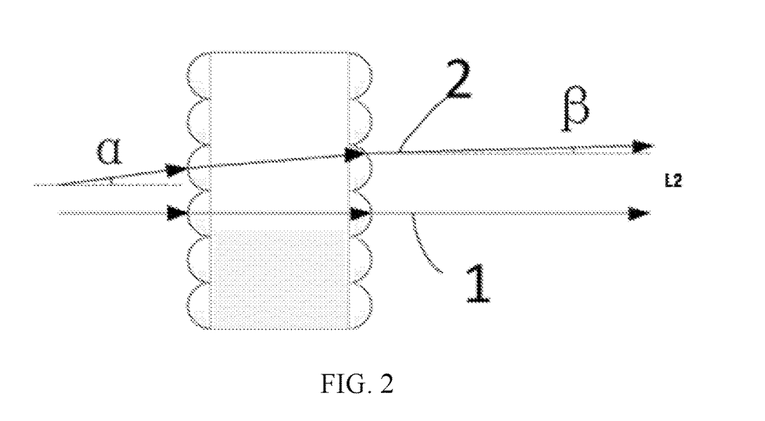
FIG. 2 is a schematic diagram of angle correction on a beam by a fly-eye lens group according to an embodiment of the present disclosure.
Figure 3:
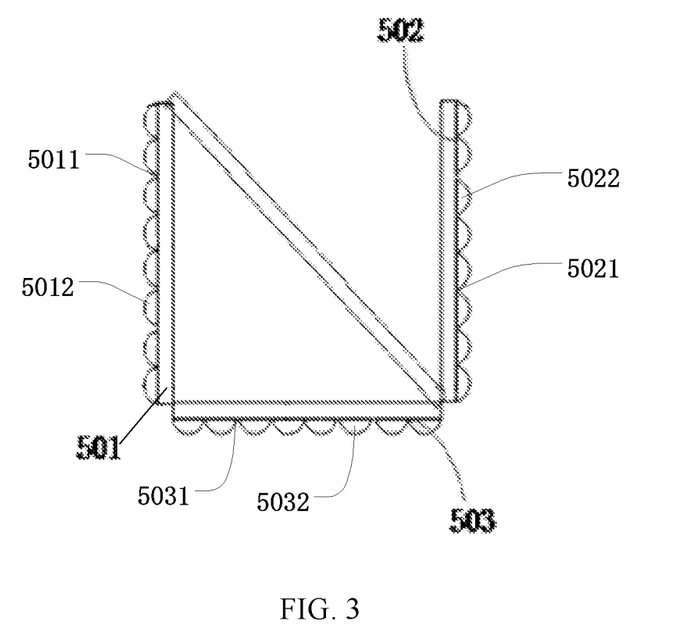
FIG. 3 is a schematic structural diagram of a fly-eye lens group according to an embodiment of the present disclosure.

Referring to FIG. 1 to FIG. 3, an embodiment of the present disclosure provides a light source device 100. The light source device 100 includes a light source 10, a wavelength conversion device 20, a collecting lens group 30, a light combination device 40, and a fly-eye lens group 50.

The fly-eye lens group 50 includes a first fly-eye lens 501, a second fly-eye lens 502, and a third fly-eye lens 503. The fly-eye lens group is substantially U-shaped. The first fly-eye lens 501 is parallel to the second fly-eye lens 502, and the first fly-eye lens 501 is perpendicular to the third fly-eye lens 503. The first fly-eye lens 501 and the second fly-eye lens 502 form a double fly-eye structure, and the third fly-eye lens 503 and the first fly-eye lens 501 form another double fly-eye structure.

The light combination device 40 is located between the first fly-eye lens 501 and the second fly-eye lens 502, and is tilted relative to both the first fly-eye lens 501 and the third fly-eye lens 503. The light combination device 40 includes a reflection region and a transmission region that surrounds the reflection region.

The light source 10 is used for emitting an illuminating beam. In some embodiments of the present disclosure, the illuminating beam may be a collimating parallel beam. In this embodiment, the light source 10 is used for emitting first excitation light L1.

The first excitation light L1 is homogenized by the third fly-eye lens 503, and then incident to the reflection region of the light combination device 40, and then reflected by the reflection region of the light combination device 40, and then incident to the first fly-eye lens 501 to be further homogenized. The first excitation light L1 homogenized by the first fly-eye lens 501 is incident to the collecting lens group 30, and the collecting lens group 30 guides the first excitation light L1 to the wavelength conversion device 20.

The wavelength conversion device 20 includes a wavelength conversion section and a non-wavelength conversion section. The wavelength conversion section includes a wavelength conversion material or a wavelength conversion structure, which can absorb the first excitation light L1 and emit excited light L3 with a wavelength different from the first excitation light L1. The non-wavelength conversion section does not change the wavelength of the first excitation light L1 but diffuses laser. The first excitation light L1 is effected by the non-wavelength conversion section to emit second excitation light L2. The non-wavelength conversion section is provided with scattered particles, a scattering sheet or a diffusion sheet to scatter the first excitation light, so that, on the one hand, a divergence angle of the second excitation light is consistent with that of the fluorescence, bringing a better display effect; and on the other hand, the scattering can eliminate the coherence of the laser.

The collecting lens group 30 is further used for collecting the excited light L3 and the second excitation light L2 outputted from the wavelength conversion device 20, and guiding the excited light L3 and the second excitation light L2 to the fly-eye lens group 50. The double fly-eye structure formed by the first fly-eye lens 501 and the second fly-eye lens 502 is used for homogenizing the excited light L3 and the second excitation light L2 outputted from the collecting lens group 30.

In an embodiment of the present disclosure, when the wavelength conversion section of the wavelength conversion device 20 is located on an optical path of the first excitation light L1, the first excitation light L1 is excited by the wavelength conversion section to form the excited light L3 with a wavelength different from the first excitation light L1. The excited light L3 is outputted from the wavelength conversion section, and then collected by the collecting lens group 30 and transmitted to the first fly-eye lens 501 for light homogenization. The excited light L3 outputted from the first fly-eye lens 501 is guided by the transmission region of the light combination device 40 to be incident to the second fly-eye lens 502. Then the excited light L3 is further homogenized by the second fly-eye lens 502.

When the non-wavelength conversion section of the wavelength conversion device 20 is located on the optical path of the first excitation light L1, the first excitation light L1 is scattered and diffused by the non-wavelength conversion section to form the second excitation light L2. The second excitation light L2 is scattered by and outputted from the non-wavelength conversion section, and then collected by the collecting lens group 30 and transmitted to the first fly-eye lens 501 for light homogenization. The second excitation light L2 outputted from the first fly-eye lens 501 is guided by the transmission region of the light combination device 40 to be incident to the second fly-eye lens 502. The second excitation light L2 is further homogenized by the second fly-eye lens 502.

A very small amount of the second excitation light L2 and the excited light L3 may enter the reflection region of the light combination device 40 and be lost, but can be ignored.

The second excitation light L2 transmitted by the light combination device 40 and the excited light L3 transmitted by the light combination device 40 are outputted along a same optical path.

In embodiments of the present disclosure, the first fly-eye lenses 501 and the third fly-eye lenses 503 are arranged before the collecting lens group 30 to adjust the first excitation light L1 incident to the fly-eye lens group 50, so as to adjust and correct a direction of the first excitation light L1 incident to the collecting lens group 30. The first fly-eye lenses 501 and the second fly-eye lenses 502 are arranged in an optical path which the beam returns, that is, behind the collecting lens group 30, to adjust the second excitation light L2 and the excited light L3 incident to the fly-eye lens group 50, so as to adjust and correct directions of the second excitation light L2 and the excited light L3 incident to the collecting lens group 30.

FIG. 2 is a schematic diagram showing a principle of an angle correction of the fly-eye lens group 50. The fly-eye lens group 50 has a good function of correcting the optical path. FIG. 2 illustrates an example in which the second excitation light L2 is incident to the first fly-eye lenses 501 and the second fly-eye lenses 501. When a beam 1 is incident along a direction parallel to an optical axis of the first fly-eye lens 501, a direction of a main optical axis of outputted light remains unchanged and is still parallel to the optical axis of the first fly-eye lens 501. When a beam 2 is incident at an angle $\alpha$ with respect to the optical axis of the first fly-eye lens 501, a main optical axis of the beam 2 is at an angle $\beta$ with respect to the optical axis of the first fly-eye lens 501, where $\alpha>\beta$. That is, the fly-eye lens group 50 has a function of reducing an inclination angle of the beam. For example, when $\alpha$ is about 1°, $\beta$ is about 0.2°. A value of the angle $\beta$ can be adjusted by adjusting a value of $\alpha$, and an adjustment accuracy is higher than an accuracy in the case where $\beta$ is adjusted directly, such that a distance between an edge of the beam of the second excitation light L2 and a central axis of the collecting lens group 30 is reduced as much as possible, thereby providing basic conditions for subsequent uniform distribution of light on an exiting surface of the whole light source device.

When the first excitation light L1 is incident to the third fly-eye lenses 503 and the first fly-eye lenses 501, the angle correction principle of the fly-eye lens group 50 is similar to the angle correction principle when the second excitation light L2 is incident to the first fly-eye lenses 501 and the second fly-eye lenses 502. In an embodiment of the present disclosure, after a beam is incident along a direction parallel to the optical axis of the third fly-eye lens 503, the beam is reflected by the light combination device 40, and the main optical axis of outputted light is parallel to the optical axis of the first fly-eye lens 501. When the beam is incident at an angle $\alpha$ with respect to the optical axis of the third fly-eye lens 503, the main optical axis of the beam is at an angle $\beta$ with respect to the optical axis of the first fly-eye lens 501, where $\alpha>\beta$. That is, the fly-eye lens group 50 has a function of reducing an inclination angle of the beam. For example, when $\alpha$ is about 1°, $\beta$ is about 0.2°. A value of the angle $\beta$ can be adjusted by adjusting a value of $\alpha$, and an adjustment accuracy is higher than an accuracy in the case where $\beta$ is adjusted directly, such that a distance between an edge of the beam of the first excitation light L1 incident to the collecting lens group 30 and the central axis of the collecting lens group 30 is reduced as much as possible. In practical applications of the present disclosure, the distance between the edge of the beam of the first excitation light L1 incident to the collecting lens group 30 and the central axis of the collecting lens group 30 can be controlled to be within a range from 0.2 mm to 0.5 mm by using this technical solution, thereby greatly improving the light spot imaging quality at the surface of the wavelength conversion device 20 and providing basic conditions for subsequent uniform distribution of light on an exiting surface of the whole light source device.

The fly-eye lens group 50 also corrects the angle of the excited light L3, and the principle is similar to the principle of correcting the first excitation light L1 and the second excitation light L2. In an embodiment of the present disclosure, after a beam of the excited light L3 is incident along a direction parallel to the optical axis of the first fly-eye lens 501, the direction of the main optical axis of outputted light remains unchanged and is still parallel to the optical axis of the first fly-eye lens 501. When the beam of the excited light L3 is incident at an angle $\alpha$ with respect to the optical axis of the first fly-eye lens 501, the main optical axis of the beam is at an angle $\beta$ with respect to the optical axis of the first fly-eye lens 501, where $\alpha>\beta$. That is, the fly-eye lens group 50 has a function of reducing an inclination angle of the beam. For example, when $\alpha$ is about 1°, $\beta$ is about 0.2°. A value of the angle $\beta$ can be adjusted by adjusting a value of $\alpha$, and an adjustment accuracy is higher than an accuracy in the case where $\beta$ is adjusted directly, such that a distance between an edge of the beam of the second excitation light L2 and the central axis of the collecting lens group 30 is reduced as much as possible, which can eliminate the problem that fluorescence emission is angular, thereby preventing the etendue dilution of fluorescence, and thus improving the imaging quality of fluorescence.

In addition to the function of angle correction, the fly-eye lens group 50 further has a function of homogenizing light spot for imaging.

As shown in FIG. 3, in an embodiment, the first fly-eye lens 501 includes a first lens array 5012, and the third fly-eye lens 503 includes a third lens array 5032. The first lens array 5012 and the third lens array 5032 each are composed of a plurality of lens units in one-to-one correspondence. Optical axes of the two lens arrays are perpendicular to each other. A focal length of the lens unit of the third lens array 5032 is equal to an optical path distance between the lens unit of the first lens array 5012 and the lens unit of the third lens array 5032 corresponding thereto. Each lens unit of the first lens array 5012 images overlappingly the corresponding lens unit of the third lens array 5032 at an infinity position, and then the overlapped image at the infinite position is imaged overlappingly at the surface of the wavelength conversion device 20 under an action of other lenses in the light source device. That is, the first excitation light L1 passes through the third lens array 5032 of the third fly-eye lens 503 and then converges into a plurality of convergence points at the light combination device 40, forming a plurality of point light sources. Light of the plurality of point light sources passes through the first lens array 5012 of the first fly-eye lens 501 to converge, thereby superimposing light spots of the point light sources to obtain a uniform light spot. Briefly, the respective lens units constituting the third lens array 5032 are imaged overlappingly at the surface of the wavelength conversion device 20. This technical solution, by superimposing the imaged light spots of the respective lens units, eliminates and compensates an influence of potential nonuniformity of certain light spots on the total light spot, thereby providing a guarantee for the subsequent uniform distribution of light at an exiting surface of the whole light source device 100. In addition, since an imaging process is from the fly-eye lens group 50 to the surface of the wavelength conversion device 20, once an imaging relationship is established, an object, an image, and a lens are determined. Even if the light incident to the fly-lens group 50 is deflected, positions and uniformity of the light spots at the surface of the wavelength conversion device 20 will not be affected (only surface distribution of the beam before or after the imaging position may be affected).

In an embodiment, the fly-eye lens group 50 further has a function of homogenizing light spot of the second excitation light L2 and the excited light L3 for imaging, and the principle is similar to the above principle. The second fly-eye lens 502 includes a second lens array 5022, optical axes of the first lens array 5012 and the second lens array 5022 are parallel to each other, and a focal point of a lens unit of the first lens array 5012 coincides with a center of a corresponding lens unit of the second lens array 5022. The second excitation light L1 and the excited light L3 converge through the first lens array 5012 of the first fly-eye lens 501, and then form uniform parallel light for output under an action of the second lens array 5022 of the second fly-eye lens 502.

That is, in the present disclosure, the first excitation light L1 incident to the wavelength adjusting device 20, the second excitation light L2 and excited light outputted from the wavelength adjusting device 20 can be angle-corrected and homogenized by the coordination of one fly-eye lens group 50 and one light combination device 40. Moreover, a first fly-eye lens pair 503 and 501 and a second fly-eye lens pair 501 and 502 share the first fly-eye lens 501, thereby reducing the use of optical elements and thus being beneficial to reducing a volume of the projection apparatus while homogenizing the beam.

The above is a basic technical solution of an Embodiment of the present disclosure. On the basis of the above, a variety of specific technical solutions can be derived from the respective assemblies of the light source device of the present disclosure based on an actual application environment, and the various technical solutions can be combined with each other, which will be exemplified by following examples.

In an embodiment of the present disclosure, the light source 10 may be a blue laser or an array of blue lasers, and the light source 10 emits a blue laser beam, which has a smaller divergence angle, a concentrated beam and a substantial Gaussian distribution, such that the optical path of the reflected excitation light can be easily distinguished from that of the excitation light emitted from the light source 10. In another embodiment of the present disclosure, the light source 10 may be a blue LED, and the light source 10 emits blue LED light. The present disclosure is not limited thereto. In an embodiment of the present disclosure, the excitation light emitted from the light source 10 has a small divergence angle.

In an embodiment of the present disclosure, as shown in FIG. 3, the third fly-eye lens 503 is connected to the first fly-eye lens 501. That is, an end of the third fly-eye lens 503 is connected to an end of the first fly-eye lens 501. In an embodiment of the present disclosure, for example, the third fly-eye lens 503 is integrally formed with the first fly-eye lens 501.

In an embodiment of the present disclosure, as shown in FIG. 3, the third fly-eye lens 503 is connected to the second fly-eye lens 502. That is, an end of the third fly-eye lens 503 is connected to an end of the second fly-eye lens 502. In an embodiment of the present disclosure, for example, the third fly-eye lens 503 is integrally formed with the second fly-eye lens 502.

In an embodiment of the present disclosure, as shown in FIG. 3, the third fly-eye lens 503 is connected between the first fly-eye lens 501 and the second fly-eye lens 502. In an embodiment of the present disclosure, for example, the third fly-eye lens 503 is integrally formed with both the first fly-eye lenses 501 and the second fly-eye lenses 502.

In another embodiment, the first fly-eye lenses 501, the second fly-eye lenses 506, and the third fly-eye lenses 503 may be disconnected from one another, i.e., separated from one another.

Figure 4:
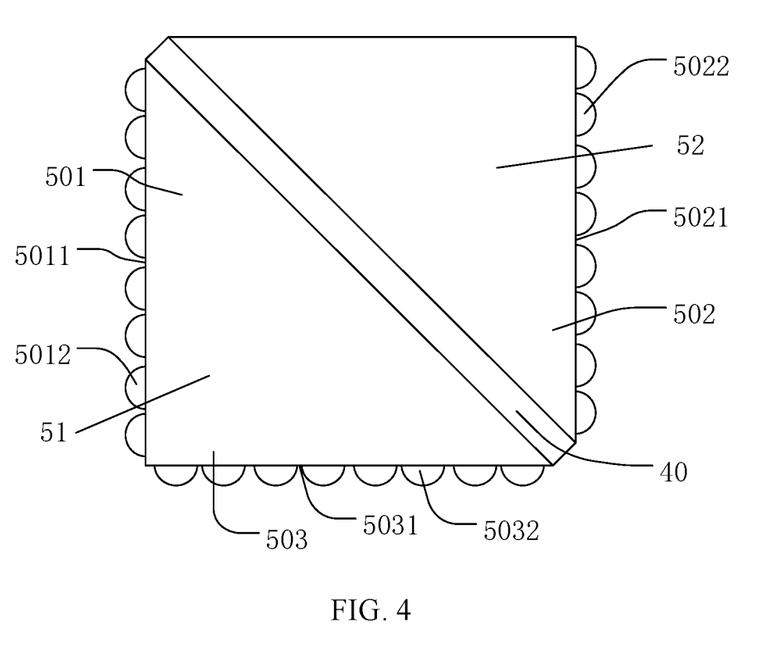
FIG. 4 is a schematic structural diagram of a fly-eye lens group according to another embodiment of the present disclosure.

In an embodiment of the present disclosure, as shown in FIG. 4, the fly-eye lens group 50 is a lens group composed of two prisms. The two prisms are a first prism 51 and a second prism 52, respectively. A long side of the first prism 51 is spliced with a long side of the second prism 52, and the light combination device 40 is arranged in a splicing gap. Two short sides of the first prism 51 are provided with the first lens array 5012 and the third lens array 5032 to form the first fly-eye lens 501 and the third fly-eye lens 503, and a short side of the second prism 52 is provided with the second lens array 5022 to form the second fly-eye lens 502. The light combination device 40 is used for guiding excitation light incident to the third fly-eye lens 503 to the first fly-eye lens 501 for output and further used for guiding excited light and excitation light incident to the first fly-eye lens 501 to the second fly-eye lens 502 for output. In an embodiment, the light combination device 40 is a dichroic film or a filter sheet. The light combination device 40 is provided at a splicing position between the first prism 51 and the second prism by means of bonding or clamping. In an embodiment, the light combination device 40 is a coating surface. At a splicing position between the first prism 51 and the second prism 52, a splicing surface of the first prism 51 may be coated with a film or a splicing surface of the second prism 52 may be coated with a film, so that the light incident to the light combination device 40 can be transmitted or reflected at the coating surface. In an embodiment, the coating surface is a surface at a long side of the first prism 51 or a surface at a long side of the second prism 52.

In an embodiment of the light source device, for example, in the fly-eye lens group 50, the third fly-eye lens 503 is formed at a right-angle side of a prism towards the light source 10, the first fly-eye lens 501 is formed at a right-angle side of a prism close to the wavelength conversion device 20, and the second fly-eye lens 502 is formed at a right-angle side of a prism away from the wavelength conversion device 20. Lens arrays are formed at surfaces of the first, second, and third fly-eye lenses 501, 502, and 503, respectively. In an embodiment, as shown in FIG. 4, the first, second, and third lens arrays 5012, 5022, and 5032 are formed at three right-angle sides of the two prisms, respectively.

In an embodiment of the present disclosure, the third fly-eye lens 503 and the first fly-eye lens 501 are roughly equal in terms of length and width. The third fly-eye lens 503, the first fly-eye lens 501, and the light combination device 40 are roughly arranged in an isosceles right triangle.

In an embodiment of the present disclosure, the first lens array 5012 includes a plurality of first micro-lenses, the second lens array 5022 includes a plurality of second micro-lenses, and the third lens array 5032 includes a plurality of third micro-lenses. The first micro-lenses, the second micro-lenses, and the third micro-lenses include convex surfaces. The convex surfaces are spherical or aspherical surfaces. That is, the first micro-lenses, the second micro-lenses, and the third micro-lenses are spherical or aspherical mirrors.

In an embodiment of the present disclosure, anti-reflection films are formed at surfaces of the first micro-lenses, the second micro-lenses, and the third micro-lenses to reduce reflection of the beam and increase intensity of the transmitted light.

In an embodiment of the present disclosure, referring to FIG. 3, the first fly-eye lens 501 includes a first outer surface 5011, the second fly-eye lens 502 includes a second outer surface 5021, the third fly-eye lens 503 includes a third outer surface 5031, the first to third outer surfaces 5011, 5021, and 5031 are connected into a roughly U shape, the first outer surface 5011 is roughly parallel to the third outer surface 5031, and the first outer surface 5011 is roughly perpendicular to the second outer surface 5021. The excitation light emitted from the light source 10 is first incident from the third outer surface 5031, is reflected at the light combination device 40 and then passes through the first outer surface 5011 for output.

In an embodiment of the present disclosure, the first lens array 5012 is arranged at the first outer surface 5011, the second lens array 5022 is arranged at the second outer surface 5021, and the third lens array 5032 is arranged at the third outer surface 5031. The third lens array 5032 divides an incident beam into a plurality of convergent beams. The plurality of convergent beams is reflected by the light combination device 40 and converges into a plurality of point light sources at the first outer surface 5011. The first lens array 5012 diffuses the light of each point light source. A reflective structure (light combination device 40) realizing optical path turning and a fly-eye structure are arranged in a triangle, thereby reducing a space occupied by the reflective structure and the fly-eye structure in the projection apparatus, and thus facilitating miniaturization of the projection apparatus, as well as reducing a length of the optical path and improving uniformity and illuminating brightness of the illuminating beam.

In an embodiment of the present disclosure, the first fly-eye lens 501, the second fly-eye lens 502, and the third fly-eye lens 503 are the same in specification; a focal length of each of the fly-eye lenses is equal to an optical distance of the beam of the excitation light propagating in the fly-eye lens group 50; optical axes of the third micro-lenses and the first micro-lenses are in one-to-one correspondence, so that an optical distance of the beam of the excitation light propagating from the third micro-lens to the first micro-lens in a corresponding column is the focal length of each of the fly-eye lenses. If a plurality of micro-lenses for each of the fly-eye lenses has a same focal length, the beam of the excitation light is converged by the third micro-lens and then correspondingly propagated to the position of the corresponding first micro-lens, with the same optical distance. For example, the third micro-lenses of the first row of the third lens array 5032 correspond to the first micro-lenses of the first row of the first lens array 5012, and the third micro-lenses of an $N^{th}$ row of the third lens array 5032 are in one-to-one correspondence to the first micro-lenses of an $N^{th}$ row of the first lens array 5012.

In an embodiment of the present disclosure, the first fly-eye lens 501 is parallel to the second fly-eye lens 502, the third fly-eye lens 503 and the first fly-eye lens 501 are arranged in a triangle, and an angle between the reflective surface of the light combination device 40 and the first outer surface of the first fly-eye lens 501 may range, for example, from 20 degrees to 70 degrees.

In an embodiment of the present disclosure, the first fly-eye lens 501 is parallel to the second fly-eye lens 502, the third fly-eye lens 503 and the first fly-eye lens 501 are arranged in an isosceles right triangle, and the optical distance of the beam of the excitation light propagating from the third micro-lens to the first micro-lens in the corresponding column is equal to a distance between the first fly-eye lens 501 and the second fly-eye lens 502, so that the focal length of each fly-eye lens is equal to the distance between the first fly-eye lens 501 and the second fly-eye lens 502.

The fly-eye lens group 50 and related devices thereof have relatively complicated light issues, and the fly-eye lens group 50 and related devices thereof can be designed with reference to the following discussion.

Figure 5:
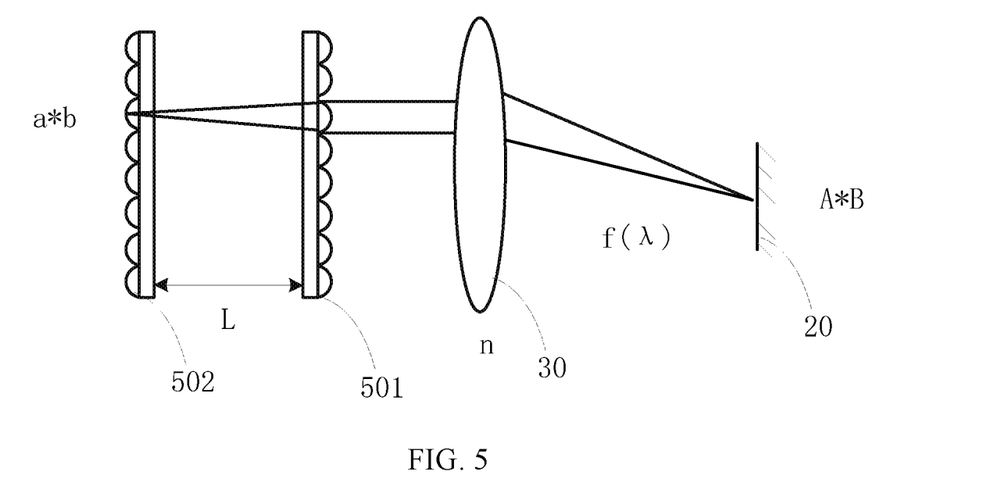
FIG. 5 is a schematic diagram illustrating an imaging relationship between two fly-eye lenses and a collecting lens according to an embodiment of the present disclosure.
Figure 6:
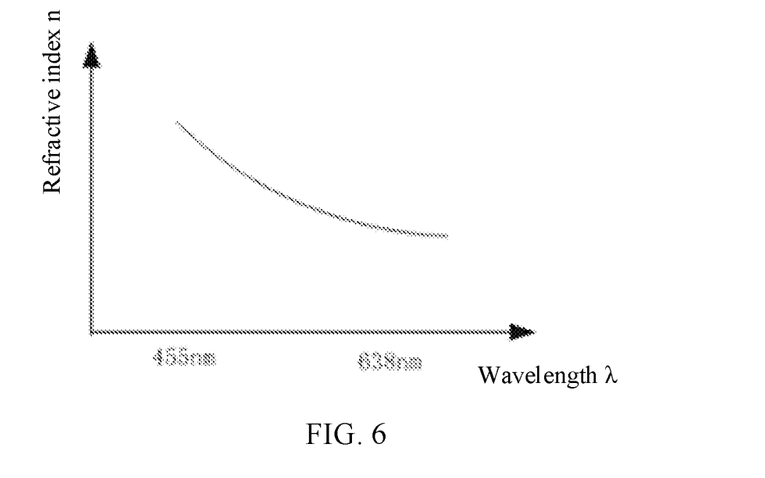
FIG. 6 illustrates a functional relationship between a refractive index n and a wavelength λ of a collecting lens according to an embodiment of the present disclosure.

FIG. 5 illustrates an imaging relationship between two fly-eye lenses and the collecting lens group 30 (convergent lens). FIG. 6 illustrates a functional relationship between a refractive index n and a wavelength $\lambda$ of a convergent lens. If a single lens unit of the fly-eye lens has a dimension of a*b, a distance between two fly-eye lenses is L (equal to a focal length $f_{MLA}$ of a lens unit of the fly-eye lens), and a fly-eye unit passes through the collecting lens group 30 (with an equivalent focal length of $f_{Lens}$) and has an imaging dimension of A*B, then $A=f_{Lens}/f_{MLA}*a$; and $B=f_{Lens}/f_{MLA}*b$. For an ideal spherical mirror, $f(\lambda)=R/(n_{(\lambda)}-1)$, where R denotes a radius of curvature of an equivalent spherical mirror unit, and $n_{(\lambda)}$ denotes a refractive index of a lens material. $n_{(\lambda)}$ is generally a function of wavelength, as shown in FIG. 6. Therefore, the larger the refractive index, the shorter the equivalent focal length of the lens. By use of the lens material, the focal length of the corresponding blue light is smaller than the focal length corresponding to the wavelength of the excited fluorescence, that is, the blue light $f_B < f_{fluorescence}$. If the collecting lens group 30 is an ideal lens group, the blue light spot on a fluorescent wheel may be an ideal image of the fly-eye unit. In addition, a light spot of the excited fluorescence is collected by the collecting lens group 30 and then enters a double fly-eye composed of the first fly-eye lens 501 and the second fly-eye lens 502 for output. Due to the principle of light reversibility, the fluorescence outputted from the second fly-eye lens 502 can be equivalent to the fluorescence incident from the fly-eye of the second fly-eye lens 502, and the fly-eye unit is imaged to the wavelength conversion device 20. During optical design, priority is given to a fluorescent optical path to design the fluorescence collecting lens group 30 and the double fly-eye lens corresponding to the fluorescence. An equivalent focal length of the fluorescence collecting lens group 30 is $f_{Lens-Phosphor}$, an equivalent focal length of the fly-eye lens for fluorescence is $f_{MLA-Phosphor}$, and a size of a fluorescence spot may be expressed as $$\begin{bmatrix} A_{Phosphor} \\ B_{Phosphor} \end{bmatrix} = \frac{f_{Lens-Phosphor}}{f_{MLA-Phosphor}} \begin{bmatrix} a \\ b \end{bmatrix}.$$

Similarly, an equivalent focal length of the laser for the fluorescence collecting lens group 30 is $f_{Lens-Laser}$, an equivalent focal length of the fly-eye lens for the laser is $f_{MLA-Laser}$, and a size of a laser spot may be expressed as $$\begin{bmatrix} A_{Laser} \\ B_{Laser} \end{bmatrix} = \frac{f_{Lens-Laser}}{f_{MLA-Laser}} \begin{bmatrix} a \\ b \end{bmatrix}.$$

In the design of the laser spot, spot diffusion on the wavelength conversion device 20 needs to be taken into account during laser excitation of the fluorescence, so the laser spot needs to be smaller than the fluorescent spot. Under this premise, chromatic dispersion of the collecting lens group 30 is smaller than chromatic dispersion of the fly-eye lens, so that magnifying power of the fluorescence corresponding to a combination of the fly-eye lens and the collecting lens group is greater than magnifying power of the laser, that is, $$\frac{f_{Lens-Phosphor}}{f_{MLA-Phosphor}} > \frac{f_{Lens-Laser}}{f_{MLA-Laser}}.$$

In an embodiment of the present disclosure, chromatic dispersion of a collecting lens material is smaller, so that $f_{Lens-Phosphor} \approx f_{Lens-Laser}$. That is, the laser and the fluorescence have close focal positions. On the other hand, the laser is incident to the third fly-eye lens 503 usually at a small angle, so the distance between the third fly-eye lens 503 and the first fly-eye lens 501 can be considered to be greater than $f_{MLA-Laser}$, which is also an optional solution to reduce the size of the laser spot on the wavelength conversion device 20. However, this solution also changes the imaging position of the laser passing through the collecting lens group, making it different from $f_{Lens-Laser}$. Therefore, in practical designs, a chromatic dispersion relationship between materials of the collecting lens group and the fly-eye lens, the distance between the third fly-eye lens 503 and the first fly-eye lens 501, and the size of the lens unit of the fly-eye lens need to be considered comprehensively.

In an embodiment of the present disclosure, the reflection region of the light combination device 40 is located approximately at a central position of the light combination device 40. Due to concentration of the beam of the first excitation light L1, the beam requires only a small area of the reflection region when passing through the reflection region. Thus, an area of the transmission region of the light combination device 40 is set much larger than an area of the reflection region. The area of the transmission region of the light combination device 40 is much larger than the area of the reflection region, so that the second excitation light L2 and the excited light L3 entering the reflection region of the light combination device 40 are as little as possible to improve the transmittance of the second excitation light L2 and the excited light L3.

In an embodiment of the present disclosure, the reflection region of the light combination device 40 may be a filter sheet/filter film/dichroic film to improve the transmittance of the excited light L3.

In an embodiment of the present disclosure, the light combination device 40, the first fly-eye lens 501 and the third fly-eye lens 503 form a structure of an isosceles right triangle, where the light combination device 40 serves as a base of the isosceles right triangle, and the first fly-eye lens 501 and the third fly-eye lens 503 serve as waists of the isosceles right triangle.

In an embodiment of the present disclosure, the collecting lens group 30 includes a plurality of convergent lenses.

In an embodiment of the present disclosure, the wavelength conversion device 20 is a wheel-disk structure (a phosphor wheel), including a wavelength conversion section and a reflection section arranged in a fan-ring shape at the wheel-disk structure. That is, the non-wavelength conversion section is the reflection section driven by a driving device (such as a motor) to rotate around a central axis of the wheel-disk. In an embodiment of the present disclosure, the wavelength conversion device 20 is a phosphor barrel/phosphor cylinder and includes a wavelength conversion section and a reflection section which are distributed around a barrel/cylinder surface, and the phosphor barrel/phosphor cylinder rotates around its axis direction so that different sections are periodically illuminated by the excitation light in different time divisions. In an embodiment of the present disclosure, the wavelength conversion device 20 is a phosphor plate and includes a wavelength conversion section and a reflection section which are sequentially arranged in a straight-line direction, and the phosphor plate linearly vibrates in the straight-line direction, such that different sections are periodically illuminated by the excitation light in different time divisions, so as to output sequential light.

In an embodiment of the present disclosure, the wavelength conversion section of the wavelength conversion device 20 includes a fluorescent material layer. The fluorescent material layer is a phosphor-organic adhesive layer (separate phosphors being bonded into a layer by an organic adhesive such as silica gel or epoxy resin), or a phosphor-inorganic adhesive layer (separate phosphors being bonded into a layer by an inorganic adhesive such as glass), or fluorescent ceramics (including: I.) a structure in which a continuous ceramic is used as a substrate and phosphor particles are distributed in the ceramic; II.) a pure phase ceramic doped with an activator element, such as YAG ceramics doped with Ce; and III.) phosphor particles being dispersed in the ceramic on the basis of a pure phase ceramic doped with an activator element). In an embodiment of the present disclosure, the wavelength conversion section includes a quantum dot layer, and a photoluminescence function is realized by a quantum dot material. The wavelength conversion device 20 includes only one wavelength conversion section (such as a yellow wavelength conversion section), or includes only two wavelength conversion sections (such as a green wavelength conversion section and a red wavelength conversion section), or includes more than two wavelength conversion sections.

In an embodiment of the present disclosure, the wavelength conversion section is provided with phosphor of at least one color. In an example, the illuminating beam is a blue laser beam, and the wavelength conversion section is divided into a green wavelength conversion section and a red wavelength conversion section. The red wavelength conversion section is provided with a phosphor layer that can be excited to generate red light or a phosphor layer that can be excited to generate a red light band. The phosphor layer that can be excited to generate the red light band is a yellow phosphor layer. By exciting the yellow phosphor layer, the fluorescence including the red light band can be generated, and red fluorescence can be filtered out through a red filter film. For ease of description, the phosphor layer that can be excited to generate red light or the phosphor layer that can be excited to generate the red light band is collectively referred to as "a red phosphor layer". The green wavelength conversion section is provided with a phosphor layer that can be excited to generate green light or a phosphor layer that can be excited to generate a green light band. The phosphor layer that can be excited to generate the green light band is a yellow phosphor layer. By exciting the yellow phosphor layer, the fluorescence including the green light band can be generated, and green fluorescence can be filtered out through a green filter film. For ease of description, the phosphor layer that can be excited to generate green light or the phosphor layer that can be excited to generate the green light band is collectively referred to as "a green phosphor layer". Therefore, the wavelength conversion section may be provided with a red phosphor layer or a fluorescent layer containing red phosphor, and a green phosphor layer. The blue laser beam is projected to the above-mentioned red wavelength conversion region and excited to generate a red fluorescent beam. The blue laser beam is projected to the above-mentioned green wavelength conversion region and excited to generate a green fluorescent beam. The red fluorescent beam and the green fluorescent beam generated by exciting the blue laser beam are shaped into a parallel beam through the fly-eye lens group 50, generating three primary colors, namely, a red fluorescent beam, a green fluorescent beam, and a blue laser beam.

It is to be noted that the above-mentioned technical solution also applies to a two-color light source. When a laser that generates two-color light source is a blue laser and a red laser, only green phosphor layer needs to be arranged at the reflective wavelength conversion device 20 (phosphor wheel). Meanwhile, a reflection region of the reflective fluorescent wheel needs to be provided with a blue reflection region and a red reflection region according to a lighting sequence of the blue laser and the red laser. Blue laser and red laser excite green phosphor and the reflective fluorescent wheel is excited to generate green fluorescence to reflect the blue laser and the red laser, which can also form three primary colors. Details are not described herein again.

In an embodiment of the present disclosure, the reflection section of the wavelength conversion device 20 includes a metal reflective surface that mirror-reflects the excitation light. In an embodiment of the present disclosure, the reflection section includes a dielectric reflecting film that mirror-reflects the excitation light. In other embodiments of the present disclosure, the reflection section employs other reflective structures to reflect the excitation light.

In an embodiment, the non-wavelength conversion section of the wavelength conversion device 20 is a transmission section. In this case, an optical path turning element is arranged on a transmission optical path of the wavelength conversion device 20 to turn the transmitted light to the fly-eye lens group 50.

In some embodiments, the light source device 100 further includes a relay lens. The relay lens is arranged at a side of the fly-eye lens group 50 from which the excited light is outputted. The relay lens is a concave lens, a convex lens, a concave lens group, a convex lens group or a combination thereof.

Figure 7:
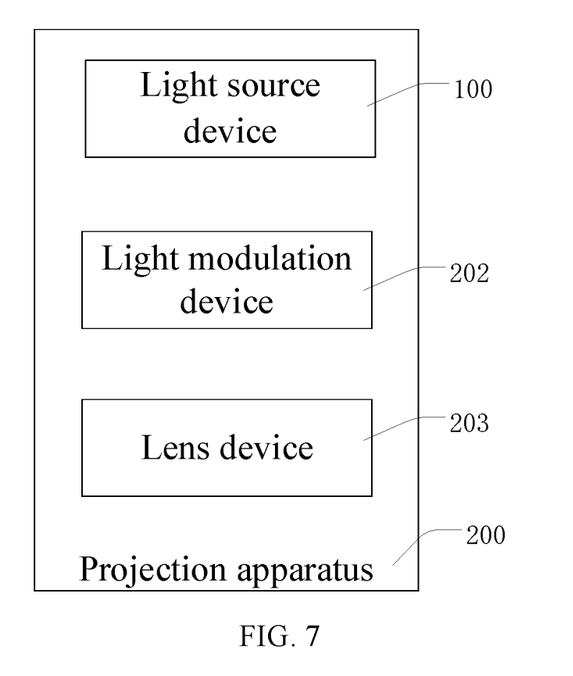
FIG. 7 is a block diagram of a projection apparatus according to an embodiment of the present disclosure.

Referring to FIG. 7, the present disclosure further provides a projection apparatus 200. The projection apparatus 200 includes the light source device 100. As shown in FIG. 7, the projection apparatus 200 further includes, for example, a light modulation device 202 and a lens device 203. By projecting the light emitted from the light source device 100 onto a light modulator of the light modulation device 202 and modulating the spatial distribution of the light according to an input image signal, the modulated light is outputted from the lens device 203 to form an image, thereby realizing a projection display function.

The projection apparatus 200 is, for example, an educational machine, a cinema machine, an engineering machine, a micro projector, a laser television and other products with laser fluorescent light sources.

The light source device 100 according to the present disclosure can also be applied to image lighting such as image projection lamps, transportation (vehicles, ships and airplanes) lights, searchlights, stage lights and the like.

The fly-eye lens group, the light source device, and the projection apparatus according to embodiments of the present disclosure can correct angles of the first excitation light, the excited light, and the second excitation light and homogenize the first excitation light, the excited light, and the second excitation light, so as to eliminate the problem that fluorescence emission is angular, preventing etendue dilution of fluorescence, and improving the imaging quality of fluorescence. Moreover, according to the present disclosure, through only one fly-eye lens group, both of the light entering the wavelength conversion device and the light exiting the wavelength conversion device can be homogenized. That is, the number of the fly-eye lens group can be reduced, and thus the light source device and the projection apparatus can be made smaller.

The phrases "embodiment(s)" and "implementation(s)" herein mean that a particular feature, structure, or characteristic described in connection with the embodiment can be included in at least one example embodiment of the present disclosure. The appearances of this phrase in various places in the specification are not necessarily all referring to a same embodiment, nor are separate or alternative embodiments mutually exclusive of other embodiments. As such, the embodiments described herein, explicitly and implicitly understood by those skilled in the art, can be combined with other embodiments.

Finally, the above-described embodiments are merely intended to illustrate technical solutions of the present disclosure and are not to limit the technical solutions. Although the present disclosure has been described in detail with reference to the above-described embodiments, those of ordinary skill in the art should understand that any modification or equivalent replacement of the technical solution of the present disclosure should not depart from the spirit and scope of the technical solution of the present disclosure.

What is claimed is:

1. A light source device, comprising:
   a light source configured to emit first excitation light;
   a wavelength conversion device comprising a wavelength conversion section and a non-wavelength conversion section, wherein the wavelength conversion section absorbs the first excitation light and outputs excited light, and the non-wavelength conversion section acts on the first excitation light to output second excitation light;
   a fly-eye lens group comprising a first fly-eye lens, a second fly-eye lens, and a third fly-eye lens, wherein the first fly-eye lens is parallel to the second fly-eye lens, the third fly-eye lens is perpendicular to the first fly-eye lens, the first fly-eye lens and the third fly-eye lens form a double fly-eye structure configured to homogenize the first excitation light emitted from the light source and output the homogenized first excitation light to the wavelength conversion device, the first fly-eye lens and the second fly-eye lens form another double fly-eye structure configured to homogenize the excited light and the second excitation light outputted from the wavelength conversion device; and
   a light combination device configured to guide the first excitation light from the third fly-eye lens to the first fly-eye lens, so as to output the first excitation light to the wavelength conversion device, and further configured to guide the excited light and the second excitation light outputted from the wavelength conversion device and passing through the first fly-eye lens to the second fly-eye lens for output.

2. The light source device of claim 1, wherein the light combination device is arranged between the first fly-eye lens and the second fly-eye lens and is tilted relative to the first fly-eye lens, the second fly-eye lens, and the third fly-eye lens.

3. The light source device of claim 2, wherein the first fly-eye lens and the third fly-eye lens have a same size; the light combination device, the first fly-eye lens and the third fly-eye lens form a structure of an isosceles right triangle, wherein the light combination device serves as a base of the isosceles right triangle, the first fly-eye lens and the third fly-eye lens serve as waists of the isosceles right triangle.

4. The light source device of claim 3, wherein a focal length of each fly-eye lens is equal to a distance between the first fly-eye lens and the second fly-eye lens.

5. The light source device of claim 1, wherein the light combination device is provided with a reflection region, and the reflection region is configured to reflect, the first excitation light incident from the third fly-eye lens, to the first fly-eye lens; and the light combination device is further provided with a transmission region surrounding the reflection region, and the transmission region is configured to transmit, the excited light and the second excitation light outputted from the first fly-eye lens, to the second fly-eye lens.

6. The light source device of claim 5, wherein the reflection region is a filter sheet, a filter film or a dichroic film that reflects the first excitation light and transmits the excited light.

7. The light source device of claim 1, wherein the fly-eye lens group is U-shaped as a whole; the fly-eye lens group comprises a first outer surface located at the first fly-eye lens, a second outer surface located at the second fly-eye lens, and a third outer surface located at the third fly-eye lens; and a first lens array is formed on the first outer surface, a second lens array is formed on the second outer surface, and a third lens array is formed on the third outer surface.

8. The light source device of claim 1, wherein the fly-eye lens group comprises a first prism and a second prism; and a long side of the first prism is spliced with a long side of the second prism, and the light combination device is arranged in a splicing gap, two short sides of the first prism are provided with lens arrays to form the first fly-eye lens and the third fly-eye lens, and a short side of the second prism is provided with a lens array to form the second fly-eye lens.

9. A fly-eye lens group, comprising a first fly-eye lens, a second fly-eye lens, and a third fly-eye lens, wherein the first fly-eye lens is parallel to the second fly-eye lens, and the first fly-eye lens is perpendicular to the third fly-eye lens; the first fly-eye lens and the second fly-eye lens form a double fly-eye structure; and the third fly-eye lens and the first fly-eye lens form another double fly-eye structure,
wherein the fly-eye lens group comprises a first prism and a second prism;
a long side of the first prism is spliced with a long side of the second prism;
two short sides of the first prism are provided with lens arrays to form the first fly-eye lens and the third fly-eye lens;
a short side of the second prism is provided with a lens array to form the second fly-eye lens; and
a light combination device is arranged in a splicing gap; the light combination device is configured to guide, excitation light incident to the third fly-eye lens, to the first fly-eye lens for output; and the light combination device is further configured to guide, excited light and excitation light incident to the first fly-eye lens, to the second fly-eye lens for output.

10. A projection apparatus, comprising a light modulation device and a light source device, wherein the light source device comprises:
a light source configured to emit first excitation light;
a wavelength conversion device comprising a wavelength conversion section and a non-wavelength conversion section, wherein the wavelength conversion section absorbs the first excitation light and outputs excited light, and the non-wavelength conversion section acts on the first excitation light to output second excitation light;
a fly-eye lens group comprising a first fly-eye lens, a second fly-eye lens, and a third fly-eye lens, wherein the first fly-eye lens is parallel to the second fly-eye lens, the third fly-eye lens is perpendicular to the first fly-eye lens, the first fly-eye lens and the third fly-eye lens form a double fly-eye structure configured to homogenize the first excitation light emitted from the light source and output the homogenized first excitation light to the wavelength conversion device, the first fly-eye lens and the second fly-eye lens form another double fly-eye structure configured to homogenize the excited light and the second excitation light outputted from the wavelength conversion device; and
a light combination device configured to guide the first excitation light from the third fly-eye lens to the first fly-eye lens, so as to output the first excitation light to the wavelength conversion device, and further configured to guide the excited light and the second excitation light outputted from the wavelength conversion device and passing through the first fly-eye lens to the second fly-eye lens for output.

11. The projection apparatus of claim 10, wherein the light combination device is arranged between the first fly-eye lens and the second fly-eye lens and is tilted relative to the first fly-eye lens, the second fly-eye lens, and the third fly-eye lens.

12. The projection apparatus of claim 11, wherein the first fly-eye lens and the third fly-eye lens have a same size; the light combination device, the first fly-eye lens and the third fly-eye lens form a structure of an isosceles right triangle, wherein the light combination device serves as a base of the isosceles right triangle, the first fly-eye lens and the third fly-eye lens serve as waists of the isosceles right triangle.

13. The projection apparatus of claim 12, wherein a focal length of each fly-eye lens is equal to a distance between the first fly-eye lens and the second fly-eye lens.

14. The projection apparatus of claim 10, wherein the light combination device is provided with a reflection region, and the reflection region is configured to reflect, the first excitation light incident from the third fly-eye lens, to the first fly-eye lens; and the light combination device is further provided with a transmission region surrounding the reflection region, and the transmission region is configured to transmit, the excited light and the second excitation light outputted from the first fly-eye lens, to the second fly-eye lens.

15. The projection apparatus of claim 14, wherein the reflection region is a filter sheet, a filter film or a dichroic film that reflects the first excitation light and transmits the excited light.

16. The projection apparatus of claim 10, wherein the fly-eye lens group is U-shaped as a whole; the fly-eye lens group comprises a first outer surface located at the first fly-eye lens, a second outer surface located at the second fly-eye lens, and a third outer surface located at the third fly-eye lens; and a first lens array is formed on the first outer surface, a second lens array is formed on the second outer surface, and a third lens array is formed on the third outer surface.

17. The projection apparatus of claim 10, wherein the fly-eye lens group comprises a first prism and a second prism; and a long side of the first prism is spliced with a long side of the second prism, and the light combination device is arranged in a splicing gap, two short sides of the first prism are provided with lens arrays to form the first fly-eye lens and the third fly-eye lens, and a short side of the second prism is provided with a lens array to form the second fly-eye lens.

* * * * *